United States Patent [19]

Wischermann

[11] Patent Number: 5,008,751
[45] Date of Patent: Apr. 16, 1991

[54] APPARATUS SYSTEM FOR DERIVING SYNCHRONIZING IMFORMATION FROM A DIGITAL VIDEO SIGNAL

[75] Inventor: Gerhard Wischermann, Weiterstadt, Fed. Rep. of Germany

[73] Assignee: BTS Broadcast Television Systems GmbH, Darmstadt, Fed. Rep. of Germany

[21] Appl. No.: 477,293

[22] Filed: Feb. 8, 1990

[30] Foreign Application Priority Data

Feb. 24, 1989 [DE] Fed. Rep. of Germany ....... 3905669

[51] Int. Cl.$^5$ .............................................. H04N 5/04
[52] U.S. Cl. ..................................... 358/148; 358/150
[58] Field of Search .............. 358/148, 149, 150, 153, 358/320, 321, 322, 337, 338, 339; 375/106, 114, 116, 118

[56] References Cited

U.S. PATENT DOCUMENTS 4,887,279 12/1989 Odenheimer .......................... 375/118

OTHER PUBLICATIONS

CCIR Recommendation 656 "Interfaces for Digital Component Video Signals in 525-Line and 625-Line Television Systems" (1986).

Primary Examiner—John W. Shepperd
Assistant Examiner—Michael D. Parker
Attorney, Agent, or Firm—Frishauf, Holtz, Goodman & Woodward

[57] ABSTRACT

Synchronizing information is obtained from a digital video signal by supplying the digital video signal to a first digital function genenator which recognizes that the beginning and end of the horizontal blanking interval the preamble of a timing reference signal that precedes the synchronizing word that concludes the timing reference signal. This function generator is clocked at the data word rate of the digital video signal. If the preamble is correctly received the function generator provides at its output register the synchronizing information provided in the corresponding bits of the synchronizing word, and also a signal designating that a valid synchronizing word has just been received. A programmable logic circuit converts this synchronizing information into synchronizing signals and also provides by means of two-bit counter sub-multiple clock signals. The derived synchronizing signals include horizontal and vertical blanking pulses, a field designating signal and a signal that designates whether the video signal is of the 625 line standard of the 525 line standard.

18 Claims, 6 Drawing Sheets

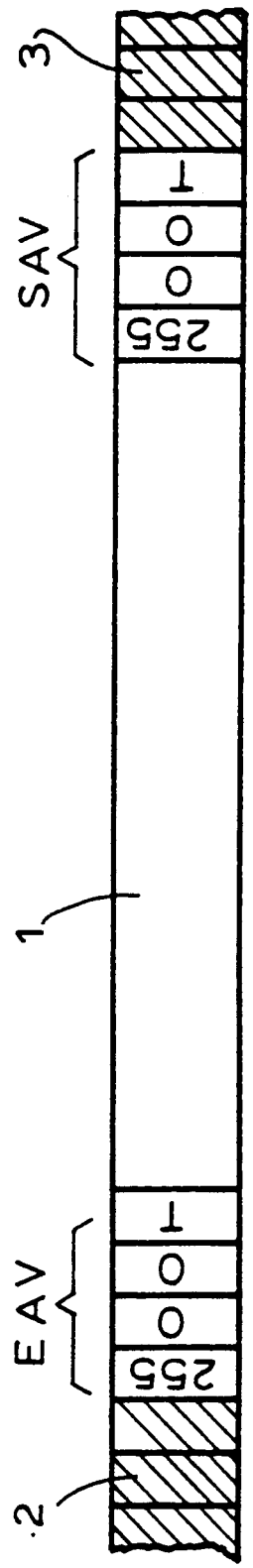

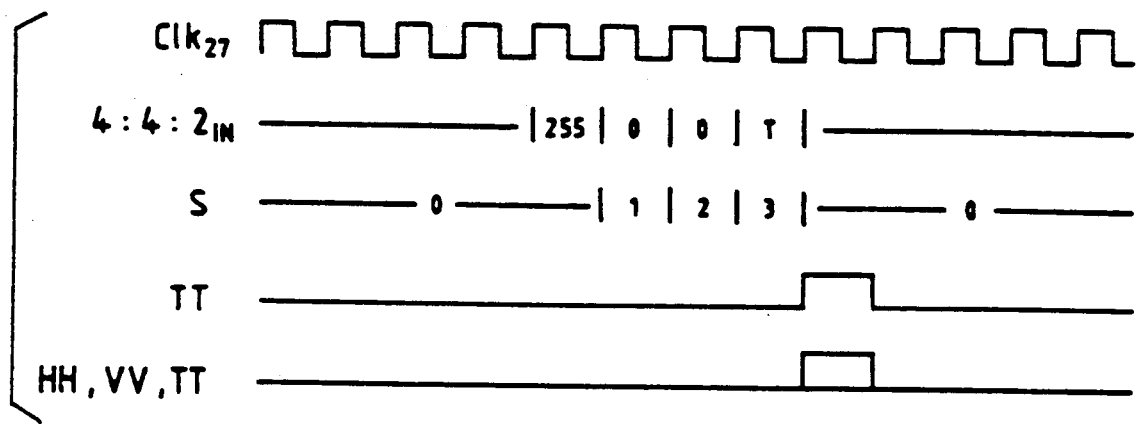
Fig. 4
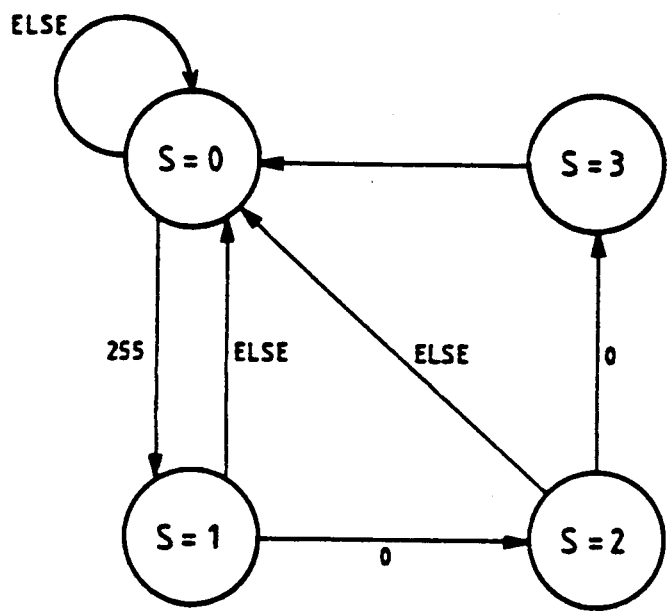
Fig. 5
Fig. 6
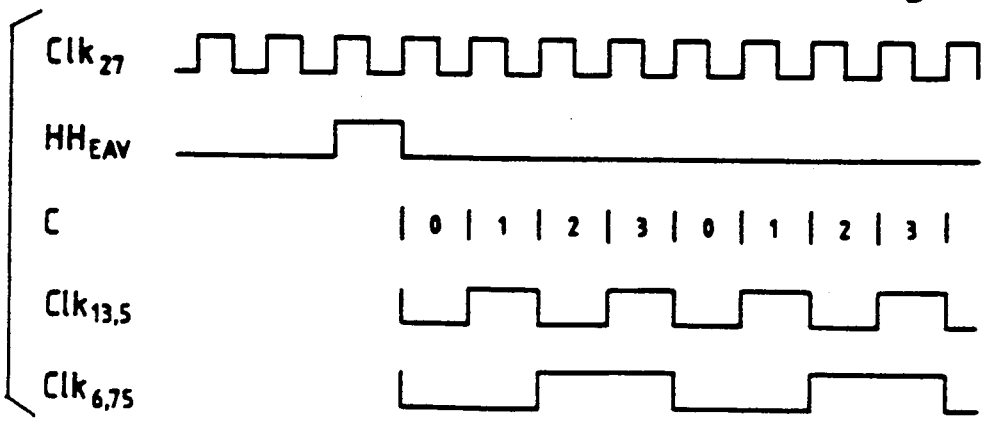

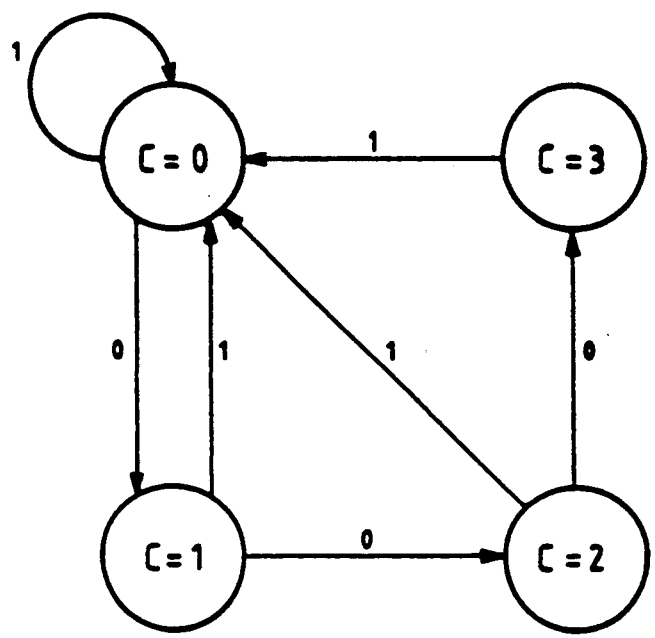
Fig. 7
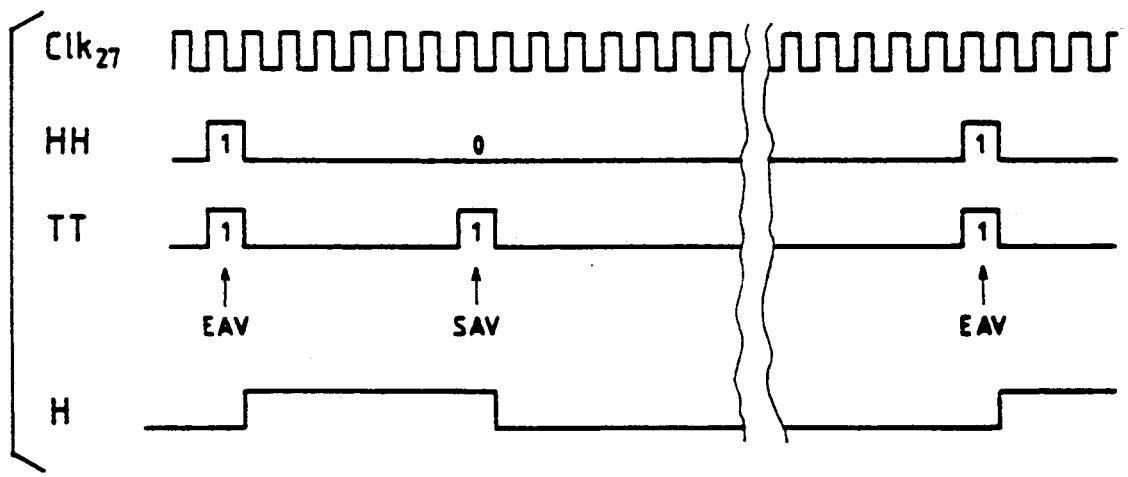
Fig. 8
Fig. 9
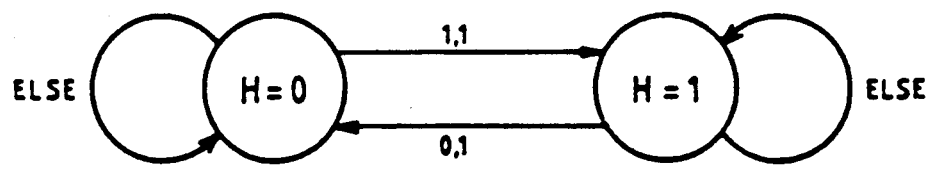

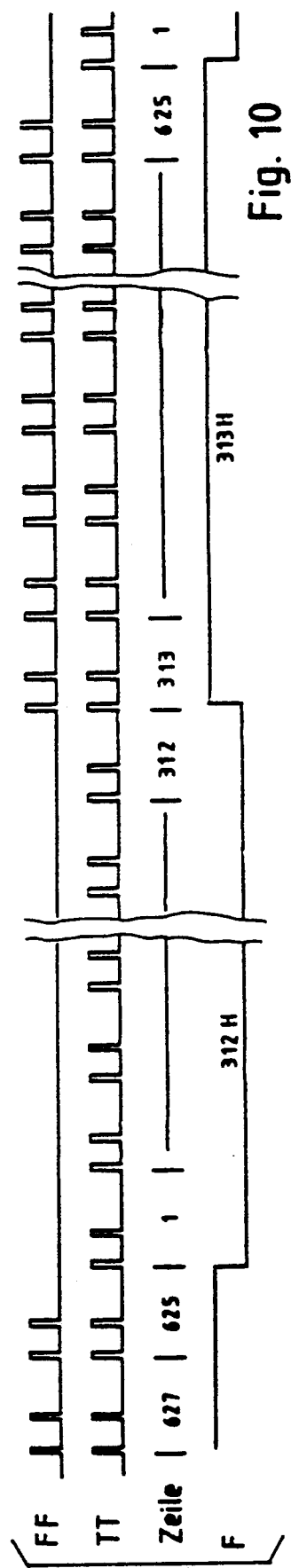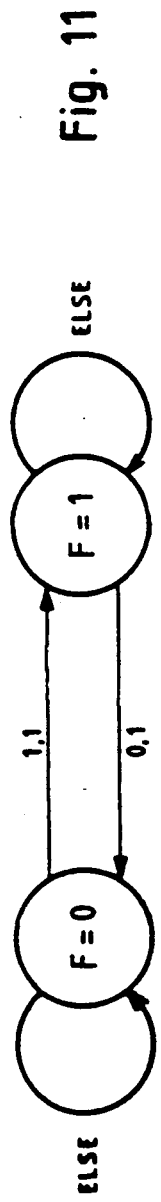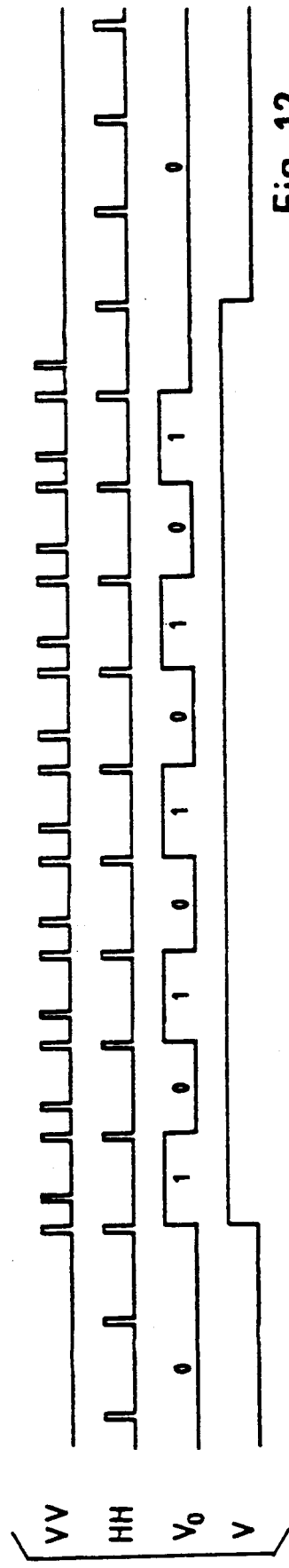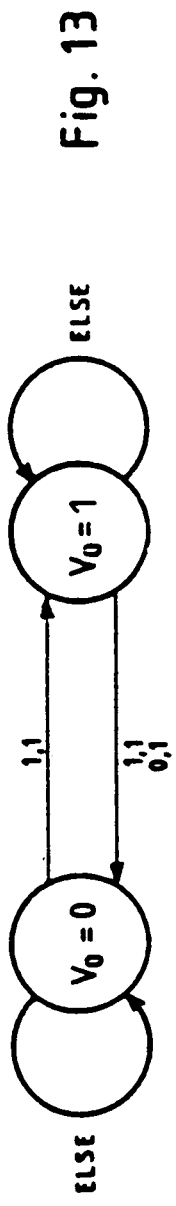

APPARATUS SYSTEM FOR DERIVING SYNCHRONIZING IMFORMATION FROM A DIGITAL VIDEO SIGNAL

This invention concerns an electronic circuit system for obtaining sync information from a digital video signal in which the sync information is present in synchronizing words (bytes) which are designated by preceding data words (bytes) of a content which is predetermined for the purpose.

In the transmission of digital video signals the synchronization information is transmitted in the form of data bytes, which are either reserved data words, which are either reserved data words or are designated by reserved data words. Thus for example in a digital video signal which conforms with the CCIR Recommendation 601/656 a so-called timing reference signal is provided before and after every horizontal frequency blanking interval. The timing reference signal consists of four words. The first three words (preamble) of the timing reference signal are reserved words, which signifies that they are not utilized for transmission of any part of the video information. The fourth word of the timing reference signal contains information defining the beginning and the end of the television lines and of the picture fields and a designation of whether the first or the second field is being transmitted (field designation signal). In addition, four binary places of the fourth word are provided for protection against error (i.e. for check bits).

SUMMARY OF THE INVENTION

It is an object of the present invention to provide an apparatus system for deriving synchronization information and also sync signals from a digital video signal which contains a timing reference signal of the kind just described.

Briefly, the digital video signal is supplied to a clocked digital function generator that is clocked by pulses of the data word frequency of the digital video signal. At the outputs of this function generator the binary places containing the synchronizing information of the sync word, as well as a signal designating that a valid sync word is present, are made available.

It is particularly advantageous to provide a program for this function generator in a read-only memory (ROM). By this program, as a result of the time sequence of the preamble words of the time reference signal a particular one of several possible logic states of the function generator is reached at which the binary places of the sync word containing the sync information are supplied to the outputs of the function generator.

The ROM further contains a table for error correction. It is also useful to provide a programmable logic circuit for deriving actual sync signals from the sync information at the output of the function generator. In such an embodiment there is a second function generator with four logic states to which the data word frequency clock signal and the horizontal sync information from the first function generator are supplied. Two binary places defining the logic state of the function generator then provide two additional clock signals at sub-multiples of the data word frequency.

It is useful to provide a third two state function generator for deriving a horizontal blanking frequency pulse. Both the line sync information and the signal for designating a valid sync word are supplied to the third function generator. A similar fourth function generator can be provided for vertical sync.

Still another two-state function generator can similarly be provided for the picture field designation signal and likewise still another two-state function generator for indicating the line number standard (525 or 625 lines).

BRIEF DESCRIPTION OF THE DRAWINGS

The invention is further described by way of illustrative example with reference to the annexed drawings, in which:

FIG. 1 is a timing diagram for explaining the timing reference signal provided in the CCIR Recommendation 601/656;

FIG. 2 is a table of the words of the timing reference signal;

FIGS. 4 and 5 are respectively timing diagrams and a state diagram of a first function generator contained in the apparatus system of FIG. 3;

FIGS. 6 and 7 are respectively timing diagrams and a state diagram of a second function generator for generating two submultiple clock signals;

FIGS 8 and 9 are respectively timing diagrams and a state diagram of a third function generator for generating horizontal frequency pulses;

FIGS. 10 and 11 are respectively timing diagrams and a state diagram of a fourth function generator for generating a picture field designating signal;

FIGS. 12 and 13 are respectively timing diagrams and a state diagram of a fifth function generator for generating a signal of half the line frequency.

DESCRIPTION OF THE ILLUSTRATED EMBODIMENT

FIG. 1 is a representation of a portion of a digital video signal occupying an interval of time encompassing a horizontal blanking interval, illustrated as a strip broken off at both ends. The digital video signal shown conforms with the CCIR Recommendation 601/656. FIG. 1 accordingly shows a blanking interval 1, the last video words 2 of the preceding line and the first video words 3 of the new line. At every beginning of a blanking interval 1 there is a timing reference signal of four words designated EAV in FIG. 1 (end of active video) and, likewise, at every end of a blanking interval 1 there is a timing reference signal SAV (start of active video) also of four words.

As is shown more exactly in FIG. 2, the first three words represent a fixed preamble (255, 0, 0) which announce that the fourth word T is a sync word. Except for the most significant bit (MSB) of the word T the values of the individual bit places depend upon the position of the particular byte T within the digital video signal. The second bit position F designates the sort of the picture field (first or second), the third bit position V designates whether or not a vertical frequency blanking interval is present and the fourth bit position H is for showing the presence of a horizontal frequency blanking interval. Four additional bit positions $P_3$ to $P_0$ belong to a check word which makes it possible in reception of the video signal to correct single bit errors arising in the transmission path.

The values of F, V and H are defined as follows in the CCIR Recommendation 656 or a 625 line standard:

| | | |
|---|---|---|
| $F_{EAV} = 0$ | FIRST FIELD | LINES 1–312 |
| $F_{EAV} = 1$ | SECOND FIELD | LINES 313–625 |
| $V_{EAV} = 1$ | VERTICAL BLANKING | LINES 624–22 |
| | | LINES 311–335 |
| $V_{EAV} = 0$ | NOT VERTICAL BLANKING | LINES 23–310 |
| | | LINES 336–623 |
| $H_{EAV} = 1$ | START OF HORIZ BLANKING | EVERY LINE |
| $H_{SAV} = 0$ | START OF ACTIVE LINE | EVERY LINE |

The value of the bit places F and V changes only with EAV, which is defined at the line beginning (not the active line beginning) of digital video signals, whereas the value at the bit place H changes with every EAV and SAV. If the bit place F is at "1", the second field is then designated. The signal F to be derived from the bit place F is therefore designated below as a field designation signal.

Figure 3:
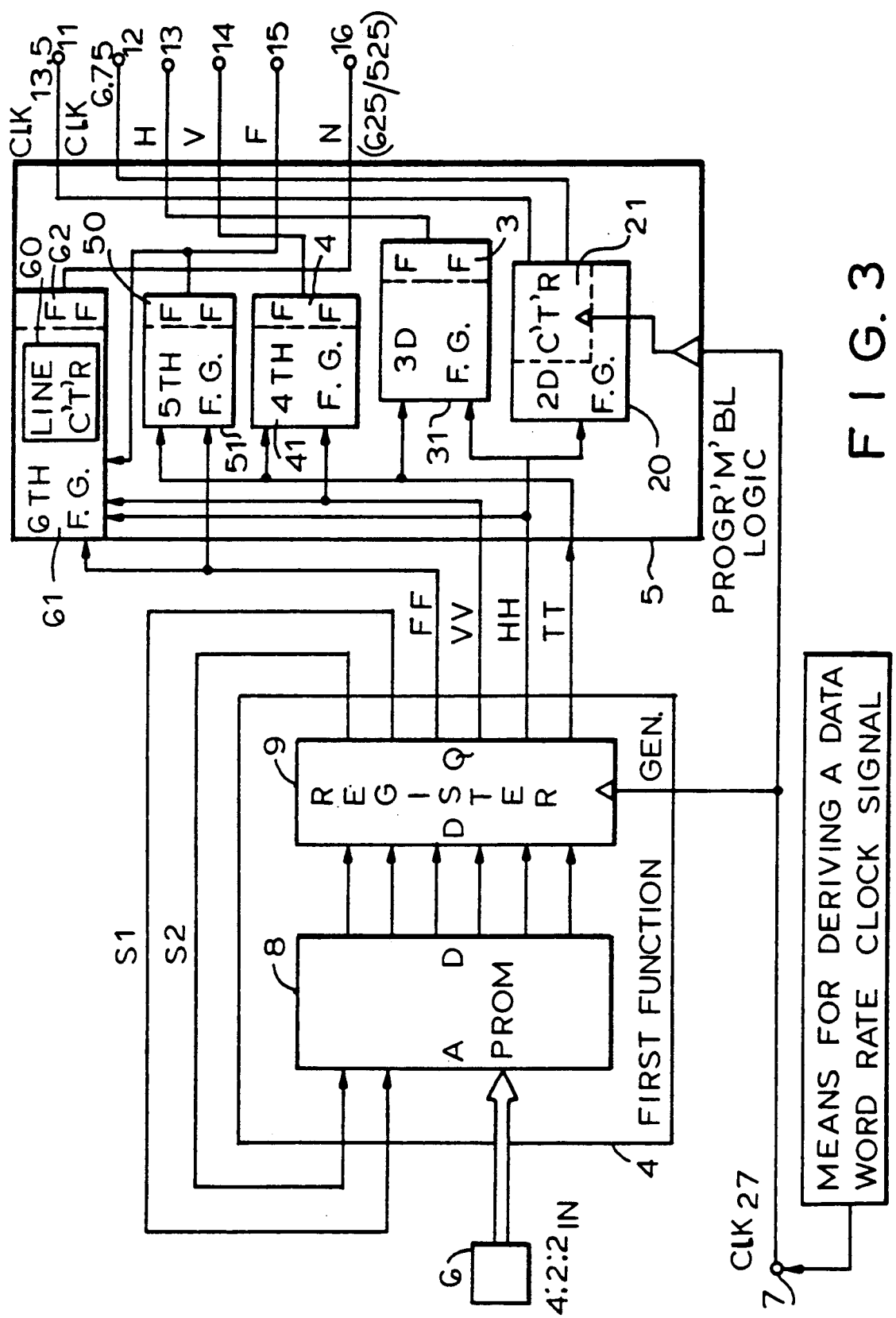
FIG. 3 is a circuit block diagram of a circuit apparatus system according to the invention.

FIG. 3 shows a circuit block diagram of an apparatus system according to the invention which consists of a first function generator 4 and a programmable logic circuit 5. The latter represents by corresponding programming a number of function generators which are described in FIGS. 6–16. The digital video signal $4:2:2_{IN}$ is, in accordance with CCIR recommendation 656, supplied as an 8-bit wide data stream to an input 6 of the first function generator 4. A clock signal $CLK_{27}$ obtained from the digital video signal proceeds through another input 7 to clock inputs of the first function generator 4 and of the programmable logic circuit 5. The clock signal $CLK_{27}$ has a frequency of 27MHz, at which the data words of the signal $4:2:2_{IN}$ follow one after another.

At the outputs 11–16 of the programmable logic circuit 5 various signals are made available which are necessary for the processing of the digital video signal $4:2:2_{IN}$. In particular, two clock signals $CLK_{13.5}$ and $CLK_{6.75}$ are needed for the word rates respectively of the luminance component and the two chrominance components. Also necessary are horizontal frequency blanking pulses H, vertical frequency blanking pulses V, the already mentioned field designation signal F and a line standard signal N which has one or the other logic level according to whether a signal of the 625 line standard or one of the 525 line standard is present.

The function generator 4 can be implemented in a simple way by a programmable read-only memory (PROM) 8, to the data outputs of which a data register 9 is connected. The PROM 8 contains, in addition to what is necessary for the function generator, a table for error correction. Six bit places of the addresses of the PROM 8 represent the input video signal $4:2:2_{IN}$, whereas two additional bit places of the addresses are formed from the state signals S1 and S2 which are fed back from the outputs of the data register. Additional outputs of the data register 9 supply signals FF, VV, HH and TT, which together represent the synchronization information separated from the digital video signal.

These signals as well as the operation of the function generator 4 can now be described with reference to FIGS. 4 and 5. The various function generators in the system of the invention are specified by their inputs and outputs values and timing and may be implemented in various ways as will be evident from their description herein.

In its state S=0 the function generator 4 awaits the first preamble word having the binary value 255. So long as that word does not present itself the unit runs through a waiting loop ELSE in the output state S=0. As soon as the input video signal takes on the binary value 255, the function generator 4 goes into the state S=1. When thereafter the binary value 0 appears, it goes into the state S=2 and when the value 0 again appears, into the state S=3. The 3 preamble words are thereby recognized. The bit places F, V, and H of the word T applied to the function generator in its state S=3 are then supplied to respective bit outputs with the next pulse of the clock signal $CLK_{27}$ and are available there as the signals FF, VV and HH.

In the meanwhile, by comparison with the bit positions P3 to P0 an error check is carried out and, if necessary, an error correction. If a correct or corrected timing reference signal is found or produced by the error check, the output bit place TT is set at 1. This last operation tells the logic circuit 5 to accept the signals FF, VV and HH. If the sync byte T is false and not correctable, the function generator 4 goes back into the state S=0 without any transfer of data from the function generator 4 into the logic circuit 5.

In the timing diagram of FIG. 4 an error free reception of the word T is assumed, so that during the period $CLK_{27}$ following that byte the transfer signal TT=1 appears. The signals HH, VV and FF can have the bit value 1 or 0 according to their respective contents. These signals appear only during a clock period following the change of state from S=3 to S=0 and set forth the synchronizing information separately for horizontal sync, vertical sync and picture field designation. These signals at this point are not yet synchronizing signals which may be set, for example, at a first flank transition at the beginning of a blanking interval and a second flank transition at the end of the blanking interval. Such signals are derived by means of the programmable logic circuit 5 which is constituted as a so-called PAL or GAL circuit. By appropriate programming, individual regions of these circuits are operated as function generators.

A second function generator 20 in the logic circuit 5 of FIG. 4 is provided for generating the clock signals $CLK_{13.5}$ and $CLK_{6.75}$ will now be explained with reference to FIGS. 6 and 7. This function generator uses a counter 21 which is clocked by the clock signal $CLK_{27}$ and is put into the state C=0 when an HH pulse appears. Thereafter the state C is incremented at every positive flank of the signal $CLK_{27}$ so long as HH=0. The two bit places of C then directly supply the signals $C_{13.5}$ and $C_{6.75}$. In the line designated C in FIG. 6 the value of C is shown as a decimal value.

Instead of a 2 bit counter for running through four states, it is also possible to utilize a counter of considerably greater capacity, for example an 11 bit counter. In that way the entire horizontal period can be counted out and by corresponding decoding of the count state pulses can be generated having any predetermined horizontal position.

FIGS. 8 and 9 show timing diagrams and a state diagram for explaining the derivation of the horizontal blanking interval pulses. For this purpose a flip-flop 30 of a third function generator 31 is programmed within the programmable logic circuit 5 shown in FIG. 3. This flip-flop is set when HH=1 and TT=1 and is reset or erased when HH=0 and TT=1. In this way the horizontal frequency blanking signal H receives a leading flank when HH=1, while the trailing flank is determined by the next appearance of the signal TT. The state diagram shown in FIG. 9 follows the logical statement H=HH·TT+H·$\overline{TT}$. By the correlation HH·TT the beginning of the pulse H is generated, so that H goes to 1 and holds this value so long as TT=1 or, as otherwise stated, so long as e,ovs/$\overline{TT}$/ =0.

The derivation of the picture field designating pulse F takes place in a similar way by means of a flip-flop 40 of a fourth function generator 41 in the logic circuit 5 and is described with reference to a timing diagram shown as FIG. 10 and a state diagram shown as FIG. 11. There again the function generator can again comprise a flip-flop to which FF and TT are supplied as input signals. FF indicates the duration of the second picture field by FF having the value 1 at the intervals EAV and SAV (FIG. 1). The logic statement for the pulse F therefore is F=FF·TT+F·$\overline{TT}$. Beginning with a state F=1 during the line 625, the state F=0 is produced at the beginning of the line 1 because at that time TT=1 or, otherwise stated $\overline{TT}$=0. This state is maintained until the beginning of the line 313. Then FF is also 1, so that FF·TT and thereby F go to the value 1.

In the same way the derivation of the pulse V takes place in accordance with the logic statement V=VV·TT+V·$\overline{TT}$ by means of a flip-flop 50 in a fifth function generator 51 in the logic circuit 5. It is accordingly not necessary to provide an explanation in detail.

The derivation from synchronizing information of a signal for indicating whether the video signal under processing is of the 625 line standard or of the 525 line standard will now be explained. This signal can be referred to as the line standard designation signal. A criterion distinguishing between the standards is the different vertical blanking. In the 625 line standard the first picture field begins with half a line, whereas in the 525 line standard the first field begins with a complete line. Since in the digital standard the timing reference signal is located in the horizontal scanning pattern, the beginning of the first field in the 625 line standard is defined as occurring in the third line of the vertical blanking interval and in the case of the 525 line standard in the fourth line of the vertical blanking interval.

For deriving the line standard signal a line counter 60 in a sixth function generator 61 in the logic circuit 5 is started with the positive flank of the V pulse. The counter is interrogated with the negative flanks of the F pulses. The result of the interrogation is a even number for 625 lines and an odd number for 525 lines, which signifies that a distinction appears in the least significant bit position, so that the counter needs to have only a single bit position. The operation of such a counter is described with reference to the timing diagrams of FIG. 12 and a state diagram provided in FIG. 13. FIG. 12 shows the signals VV, HH and V, the derivation of which has already been described, and in addition the signal $V_o$ which designates the content of the counter, which may be regarded as the state of a function generator. When VV=1 and HH=1, the counter is released so that it can alternately takes on the states $V_o$=1 and $V_o$=0 with successive pulse of the signal HH. When VV=0 and HH=1 the state $V_o$=1 is obtained or maintained. In the case of other combinations the counter remains in its preceding state. The logic statement for $V_o$ is: $V_o=\overline{V_o}$·VV·HH+$V_o$·$\overline{HH}$. Accordingly $V_o$ is to be changed into $\overline{V}_o$ when VV and HH are both equal to 1. Maintenance of the state $V_o$ is imposed when HH=0. These conditions for the resetting of the signal $V_o$ at the end of the vertical frequency blanking interval when VV=0 and HH=0 is likewise fulfilled in the above logic statement.

Figure 14:
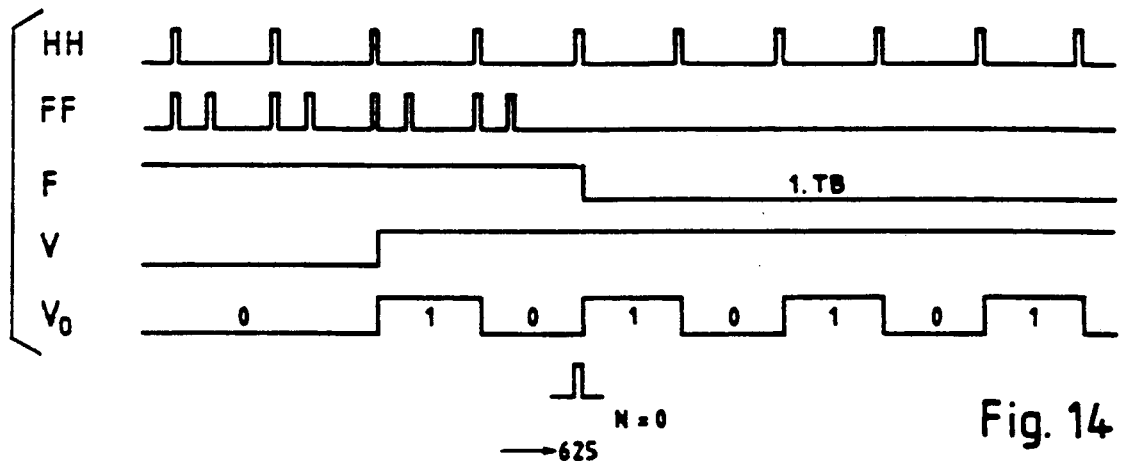
FIGS. 14, 15 and 16 are respectively timing diagrams and a state diagram of a sixth function generator for generating a line standard designation signal.
Figure 15:
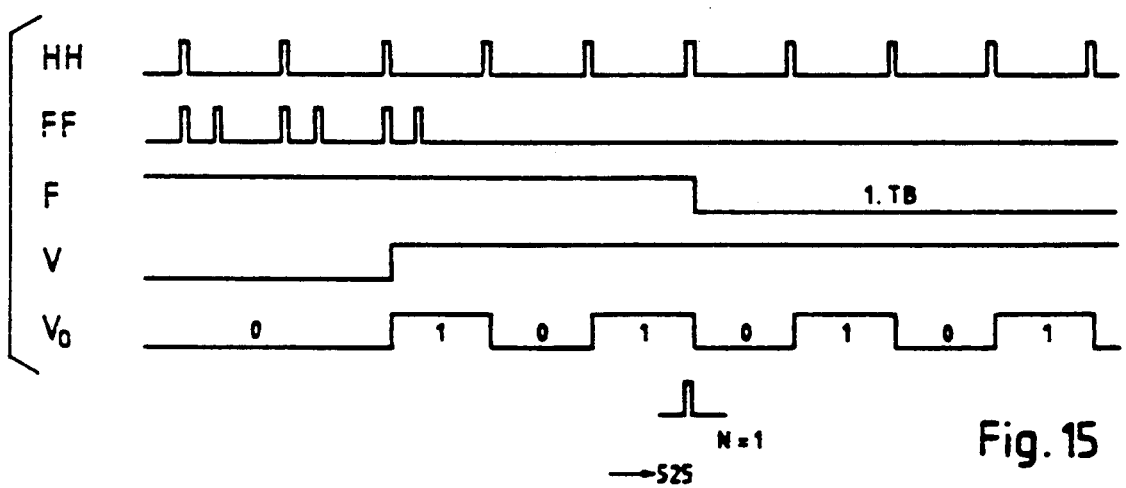
Figure 16:
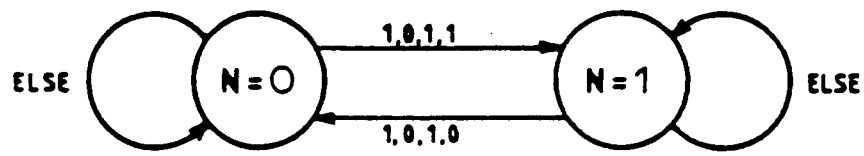

After the signal $V_o$ is obtained in the manner illustrated in FIGS. 12 and 13, it is necessary to make an interrogation at the beginning of a frame in order to produce the actual line standard signal. This operation is illustrated in FIG. 14 for the 625 line standard and in FIG. 15 for the 525 line standard, by means of timing diagrams, while FIG. 16 shows a state diagram which holds in the same way for both standards. The timing diagrams in FIGS. 14 and 15 show in each case, in addition to the signals already shown in FIG. 12, the falling flanks of the picture field designating signal F. It is evident from FIG. 14 that during the falling flanks of the picture field signal F the signal $V_o$ has the value 0, whereas in the case of the 525 line standard, illustrated in FIG. 15, $V_o$=1 at the falling flanks of the picture field F.

By means of a function generator that can assume only two states and therefore can be implemented by a flip-flop 62 of the sixth function generator 60 the repeated results of interrogation can be converted into a continuing signal. For this purpose there should be considered the function generator variables HH, FF, F and $V_o$ of which the first three determine the interrogation instant, while $V_o$ delivers the interrogation result. It is evident from the state diagram (FIG. 16) that from the state N=0 it is possible to get into the state N=1 only when the above named input variables have the respective values 1, 0, 1, 1, which signifies that the interrogation result is 1. The state N=1 therefore designates input signals according to the 525 line standard. If the interrogation result is $V_o$=0 (FIG. 14), the state N=0 is entered, which designates a 625 line input signal. The logic statement for the line standard signal is accordingly N=N·$\overline{F}$+N·FF+N·$\overline{FF}$·$\overline{HH}$+$V_o$·F·$\overline{FF}$·HH.

The programming of the programmable logic circuit 5 (FIG. 1) or of the read-only memory 8 in the first function generator 4 is a routine operation familiar to those skilled in the art and is completely described by the provision of the state diagrams and of the logic statements. A known method of developing the logic statements for the programming of programmable logic circuits is the development of a Karnau diagram. Besides, computer programs (for example ABEL) are available which support that type of programming.

Although the invention has been described with reference to a particular illustrative example, it will be understood that modifications and variations are possible within the inventive concept.

I claim:

1. Apparatus system for deriving synchronizing information from a digital video signal containing said synchronizing information in sync words, the arrival of each of which is announced by a preceding data word preamble of predetermined content, said system comprising:

means for deriving a data word rate clock signal (CLK$_{27}$) from said video signal;

a clocked first function generator (4), having a clock input connected to said means for deriving said clock signal, for clocking of said function generator thereby, and having a video signal input and a multi-bit output;

means for supplying said video signal (4:2:2$_{IN}$) to said video signal input of said function generator, said function generator having an internally stored program for producing at respective bit outputs of said multi-bit output, in response to said video signal, the contents of the bit places of said sync words of said video signal containing synchronizing information (FF, VV, HH) and an additional one-bit signal (TT) which designates when a sync word is present.

2. The apparatus system of claim 1, wherein said function generator is programmed for producing at said respective bit outputs of said multi-bit output thereof, horizontal synchronizing information (HH), vertical synchronizing information (VV) and picture field designation information (FF).

3. The apparatus system of claim 1, wherein said first function generator (4) comprises a read-only memory (8) having address inputs connected to said video signal input of said function generator and a data register (9) having inputs respectively connected to corresponding outputs of said read-only memory (8) and outputs constituting said multi-bit output of said function generator, said read-only memory having additional address inputs not connected to said video signal input, including two inputs connected to two data outputs of said data register (9) for feedback therefrom.

4. The apparatus system of claim 3, wherein said read-only memory (8) includes an internal program whereby in response to said data word preamble and a following sync word said function generator passes through a succession of logic states in the last of which the result is to pass to said multi-bit output of said function generator the content of the bit places of said sync word containing the synchronizing information.

5. The apparatus system of claim 4, wherein said read-only memory (8) also contains a table for error correction and is provided with inputs and at least one output for performing error correction.

6. The apparatus system of claim 2, wherein conversion means are provided for converting said synchronizing information and said additional one-bit signal (TT) provided at said respective bit outputs of said function generator into synchronizing signals.

7. The apparatus system of claim 6, wherein said conversion means comprises a programmable logic circuit (5) having inputs respectively connected to said respective bit outputs of said function generator and having outputs respectively for said synchronizing signals.

8. The apparatus system of claim 7, wherein said programmable logic circuit (5) contains a second function generator having four logic states, having a clock input connected to said means for deriving said clock signal for clocking said first function generator, an input connected to said output of said first function generator allocated to horizontal synchronizing information (HH), said second function generator having two-bit outputs for designating said four logic states at which, respectively, two additional clock signals ($CLK_{13.5}$, $CLK_{6.75}$) are made available.

9. The apparatus system of claim 8, wherein said programmable logic circuit (5) further comprises a third function generator having two states for deriving a horizontal frequency blanking pulse signal (H), said third function generator having inputs respectively connected to outputs of said first function generator for said line synchronizing information (HH) and said additional one-bit signal (TT) and wherein said third function generator operates in accordance with the logic statement $H = HH \cdot TT + H \cdot \overline{TT}$.

10. The apparatus system of claim 9, wherein a fourth function generator having two states is provided for generating a vertical frequency blanking pulse signal (V) having inputs respectively connected to said outputs of said first function generator for said vertical synchronizing information (VV) and said additional one-bit signal (TT), said fourth function generator being programmed for operation in accordance with the logic statement $V = VV \cdot TT + V \cdot \overline{TT}$.

11. The apparatus system of claim 10, further comprising a fifth function generator having two states for deriving a picture field designation signal (F) and having inputs connected to said respective outputs of said first function generator for picture field designation information (FF) and said additional one-bit signal TT said fifth function generator being programmed in accordance with the logic statement $F = FF \cdot TT + F \cdot \overline{TT}$.

12. The apparatus system of claim 8, wherein a sixth function generator having two states is provided for deriving a line standard signal (N) having inputs connected to said outputs of said first function generator for said vertical synchronizing information (VV), for said line synchronizing information (HH) for said picture field designation information (FF), having also an input connected to said picture field designation signal and an input connected to a source (60) of a signal ($V_o$) having half the line frequency, said sixth function generator being programmed for operation according to the logic statement $N = N \cdot \overline{F} + N \cdot FF + N \cdot \overline{FF} \cdot \overline{HH} + V_o \cdot F \cdot \overline{FF} \cdot HH$.

13. The apparatus system of claim 8, wherein second said function generator comprises a counter with a capacity of at least two bits.

14. The apparatus system of claim 9, wherein said third function generator comprises a flip-flop.

15. The apparatus system of claim 10, wherein said fourth function generator comprises a flip-flop.

16. The apparatus system of claim 11, wherein said fifth function generator comprises a flip-flop.

17. The apparatus system of claim 12, wherein said sixth function generator comprises a flip-flop.

18. The apparatus system of claim 12, wherein at least one of said second, third, fourth, fifth and sixth function generators are embodied in a programmable logic array (PAL) component unit.

* * * * *